(12) United States Patent
Shibuta et al.

(10) Patent No.: US 8,464,557 B2
(45) Date of Patent: Jun. 18, 2013

(54) METHOD OF PRODUCING OPTICAL FIBER PREFORM AND OPTICAL FIBER

(75) Inventors: Taeko Shibuta, Tokyo (JP); Tadashi Takahashi, Tokyo (JP); Takeshi Yagi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 79 days.

(21) Appl. No.: 13/279,850

(22) Filed: Oct. 24, 2011

(65) Prior Publication Data

US 2012/0118020 A1    May 17, 2012

(30) Foreign Application Priority Data

Nov. 12, 2010  (JP) ................................. 2010-254003

(51) Int. Cl.
  *C03B 37/012* (2006.01)
(52) U.S. Cl.
  USPC .................... 65/421; 65/413; 65/435; 65/393

(58) Field of Classification Search
  USPC .................................... 65/421, 413, 435, 393
  See application file for complete search history.

(56) References Cited

FOREIGN PATENT DOCUMENTS

| JP | 10-95628 | 4/1998 |
|---|---|---|
| JP | 2002-145634 | 5/2002 |
| JP | 2004-244260 | 9/2004 |

OTHER PUBLICATIONS

U.S. Appl. No. 13/293,605, filed Nov. 10, 2011, Takahashi, et al.

*Primary Examiner* — Queenie Dehghan
(74) *Attorney, Agent, or Firm* — Oblon, Spivak, McClelland, Maier & Neustadt, L.L.P.

(57) ABSTRACT

A method of producing an optical fiber preform includes preparing a glass preform that has a hole extending in a longitudinal direction formed on one end of the glass preform in such a manner that a length of the hole is equal to or less than half of an entire length of the glass preform, synthesizing a porous glass preform by depositing glass particles on an outer circumference of the glass preform having the hole formed on the end, and sintering the porous glass preform after arranging the porous glass preform in such a manner that the end having the hole formed thereon points downward and the hole is open to the air.

4 Claims, 5 Drawing Sheets

METHOD OF PRODUCING OPTICAL FIBER PREFORM AND OPTICAL FIBER

CROSS-REFERENCE TO RELATED APPLICATION

This application is based upon and claims the benefit of priority from the prior Japanese Patent Application No. 2010-254003, filed on Nov. 12, 2010; the entire contents of which are incorporated herein by reference.

BACKGROUND OF THE INVENTION

1. Field of the Invention

The present invention relates to a method of producing an optical fiber preform and an optical fiber, each having a plurality of holes extending in the axial direction.

2. Description of the Related Art

A typical optical fiber made of silica glass includes a core having a refractive index increased by, for example, being doped with germanium and also includes a cladding that surrounds the core and has a refractive index less than that of the core. Due to the effect of the total reflection of light that occurs at the boundary surface between the cladding and the core, light passes through within the core. Conventionally, the practicable relative refractive-index difference between the core and the cladding is no more than about 3% to 4%.

In contrast, recently, an optical fiber has been reported that has a relative refractive-index difference greater than that of such a conventional optical fiber (see, for example, Japanese Patent Application Laid-open No. H10-95628). It is reported in Japanese Patent Application Laid-open No. H10-95628 that, by forming, in the cladding, a plurality of holes extending in the longitudinal direction, the average refractive index of the cladding is largely decreased. In other words, such an optical fiber having holes has an effective relative refractive-index difference between the core and the cladding much greater than that of the conventional optical fiber.

Such an optical fiber having holes is produced by producing an optical fiber preform having holes and then heating and drawing it. Typical methods of forming holes on an optical fiber preform include a method of boring holes at predetermined positions on a solid glass preform by using a drill (see, for example, Japanese Patent Application Laid-open No. 2002-145634), a method of binding together a plurality of glass tubes and glass rods and then fusing the outer surfaces of the glass tubes and the glass rods together by heat in such a manner that the holes of the glass tubes remained (see, for example, Japanese Patent Application Laid-open No. H10-95628), and so on.

For such an optical fiber having holes, for the purpose of achieving desirable characteristics, it is preferable to have holes that are not deformed and are uniform over the entire length of the optical fiber in the longitudinal direction.

A method of producing an optical fiber preform with suppressed deformation of holes has been proposed that involves depositing glass particles on the outer circumference of a glass preform having a plurality of holes extending in the longitudinal direction, thereby forming a porous glass preform, and then sintering the porous glass preform, thereby producing an optical fiber preform having the holes extending in the longitudinal direction (see, Japanese Patent Application Laid-open No. 2004-244260).

SUMMARY OF THE INVENTION

It is an object of the present invention to at least partially solve the problems in the conventional technology.

According to one aspect of the present invention, there is provided a method of producing an optical fiber preform, including preparing a glass preform that has a hole extending in a longitudinal direction formed on one end of the glass preform in such a manner that a length of the hole is equal to or less than half of an entire length of the glass preform, synthesizing a porous glass preform by depositing glass particles on an outer circumference of the glass preform having the hole formed on the end, and sintering the porous glass preform after arranging the porous glass preform in such a manner that the end having the hole formed thereon points downward and the hole is open to the air.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENTS

Exemplary embodiments of a method of producing an optical fiber preform and an optical fiber according to the present invention are described in detail below with reference to the accompanying drawings. It should be noted that the invention is not limited to the following embodiments.

If the method described in Japanese Patent Application Laid-open No. 2004-244260 is used, when the porous glass preform is sintered, the holes formed in the glass preform may be deformed due to shrinkage of the glass preform that occurs when the porous glass layer is sintered and due to extension of the glass preform caused by its own weight when it is heated during sintering. This phenomenon becomes more prominent in larger optical fiber preforms. In other words, even if the method described in Japanese Patent Application Laid-open No. 2004-244260 is used, deformation of the holes with respect to the longitudinal direction of the optical fiber preform still occurs.

In contrast, according to an embodiment of the present invention, an optical fiber preform and an optical fiber in which deformation of the holes in the longitudinal direction is suppressed are realized.

Embodiment

Figure 1:
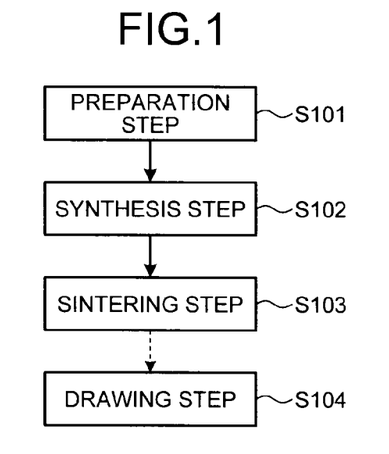
FIG. 1 is a flowchart of a method of producing an optical fiber preform and an optical fiber according to an embodiment.

FIG. 1 is a flowchart of a method of producing an optical fiber preform and an optical fiber according to an embodiment of the present invention.

The method of producing an optical fiber preform according to the present embodiment involves, as illustrated in FIG.

1, a preparation step of preparing a glass preform that has holes extending in the longitudinal direction formed on one end in such a manner that the length of the holes is equal to or less than half the entire length of the glass preform (Step S101); then a synthesis step of depositing glass particles on the outer circumference of the prepared glass preform and synthesizing a porous glass preform (Step S102); and then a sintering step of sintering the porous glass preform (Step S103). With these steps, an optical fiber preform having a plurality of holes extending in the axial direction is produced.

The method of producing an optical fiber according to the present embodiment involves a drawing step of arranging the optical fiber preform produced with Steps S101 to S103 in such a manner that the end having the holes formed thereon points upward and then drawing the other end on which the holes are not formed (Step S104). With this step, an optical fiber having a plurality of holes extending in the axial direction is produced.

Each step is described more specifically below. FIGS. 2A and 2B and 3A to 3D are schematic diagrams that illustrate a first example and a second example of the preparation step of Step S101.

At the preparation step, a glass preform is produced that has holes formed on one end extending in the longitudinal direction. Methods of producing a glass preform that has holes formed on one end extending in the longitudinal direction include a method of binding together a plurality of glass tubes or a plurality of glass tubes and glass rods so that they are tightly packed, then integrating them together, thereby producing a glass preform having holes, and then joining the glass preform to a solid cylindrical glass preform, and a method of boring holes on one end of a cylindrical glass preform, and the like.

In the following, a method will be explained of producing a glass preform having holes extending in the longitudinal direction that involves boring holes on one end of a cylindrical glass preform.

Figure 2A:
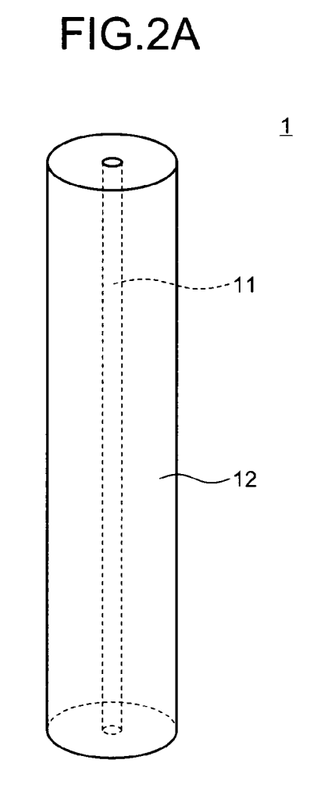
FIGS. 2A and 2B are schematic diagrams that explain a first example of the preparation step.

Firstly, the first example illustrated in FIGS. 2A and 2B will be explained. Firstly, by using a well known method, such as a VAD (Vapor phase Axial Deposition) method, an OVD (Outside Vapor Deposition) method, or an MCVD (Modified Chemical Vapor Deposition) method, a cylindrical glass preform 1 made of silica glass is produced as illustrated in FIG. 2A.

The glass preform 1 includes a core 11 that is at a center portion and has a refractive index increased by being doped with Ge, or the like, and also includes a cladding 12 that surrounds the core 11 and has a refractive index less than that of the core 11 that is made of pure silica glass and the like. The pure silica glass means silica glass that contains no refractive-index adjusting dopant. The amount of Ge or the like, used for doping may change depending on the required characteristics of the optical fiber. The glass preform may include no core, i.e., the entire glass preform may be made of pure silica glass.

Figure 2B:
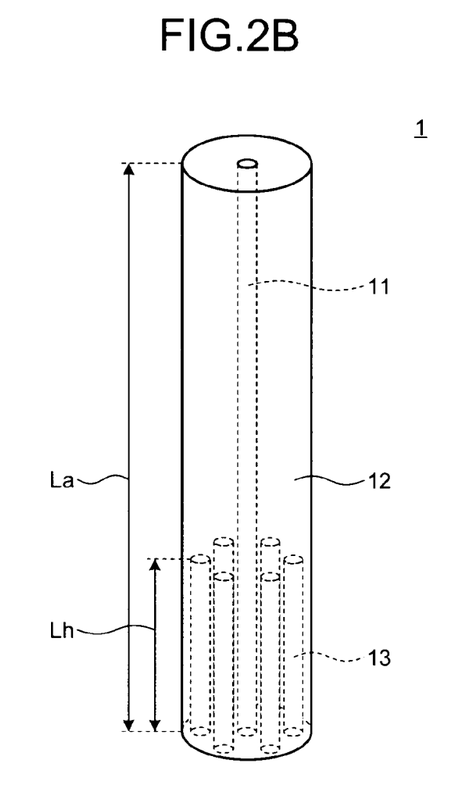

As illustrated in FIG. 2B, one or more holes 13 are bored on the cladding 12 of the glass preform 1 by using a mechanical means, such as drilling, in such a manner the holes 13 extend in the longitudinal direction of the glass preform 1. In this example, the holes 13 that are formed are six. The holes 13 may be formed on the core 11 or may be formed on both the core 11 and the cladding 12. The holes 13 are not formed on both ends but either one of the ends. A length Lh of the holes 13 is set to a value equal to or less than half the length La of the glass preform to suppress deformation of the holes 13 in the longitudinal direction. With this configuration, at the later-described sintering step (Step S103), deformation of the holes 13 is suppressed. The deformation is caused by shrinkage of the porous glass preform that occurs when the glass-particle deposit layer is sintered and also caused by extension of the porous glass preform due to its own weight when it is heated during sintering. To suppress deformation of the holes 13 more definitely, it is more preferable to set the length Lh of the holes 13 to a value equal to or less than one third of the length La of the glass preform 1.

Subsequently, the inner surfaces of the formed holes 13 are cleaned and subjected to optical polish.

Figure 3A:
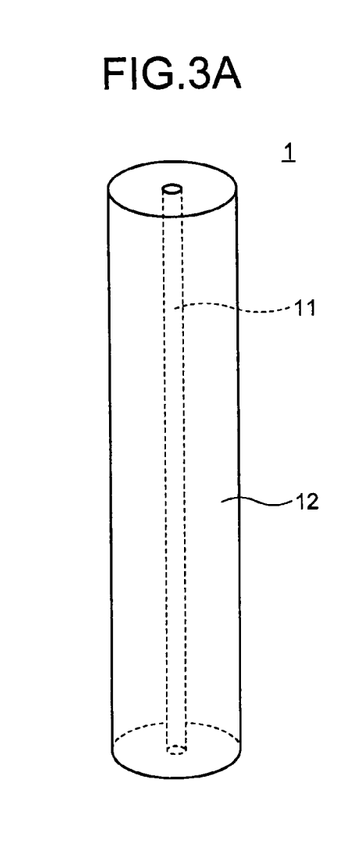
FIGS. 3A to 3D are schematic diagrams that explain a second example of the preparation step.
Figure 3B:
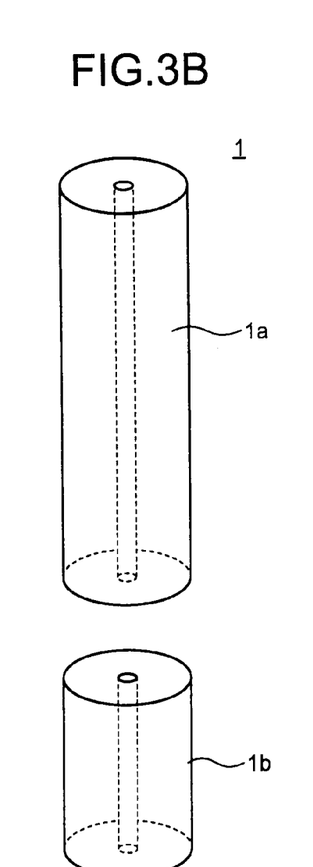
Figure 3C:
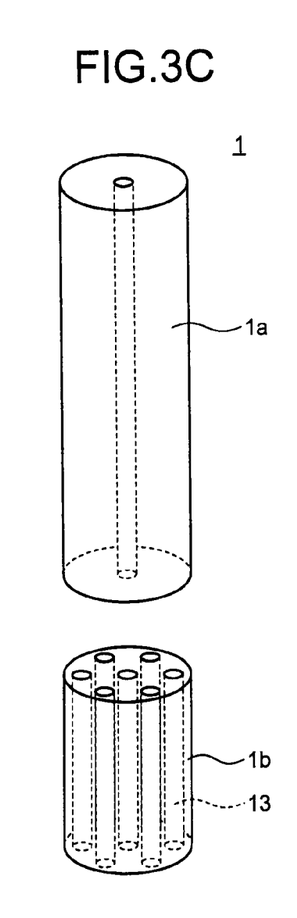
Figure 3D:
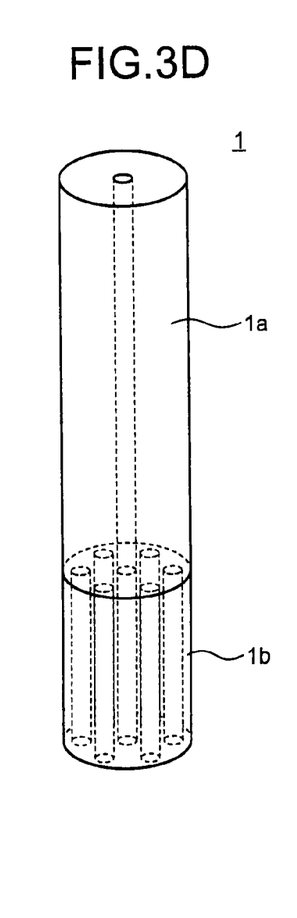

The second example illustrated in FIGS. 3A to 3D will be explained below. Firstly, as illustrated in FIG. 3A, the same glass preform 1 as that of FIG. 2A is produced. Then, as illustrated in FIG. 3B, the glass preform 1 is separated into two: a glass preform 1a and a glass preform 1b. After that, as illustrated in FIG. 3C, the holes 13 are bored on the glass preform 1b, and the inner surfaces are cleaned and subjected to optical polish. Then, as illustrated in FIG. 3D, the glass preform 1b is joined to the glass preform 1a having no holes 13 bored thereon. The glass preforms 1a and 1b can be joined together by, for example, heating the end surfaces of the glass preforms 1a and 1b and fusion-splicing them together. The heat for joining the glass preforms 1a and 1b together can be produced by a flame, an electric furnace, or the like.

As described above, because the glass preform 1 is separated into two sections and then the holes 13 are formed on one section or the glass preform 1b, the positional accuracy of the formed holes 13 is increased and the inside of the holes are cleaned and polished sufficiently. Although, in the second example illustrated in FIGS. 3A to 3D, the glass preform 1 is separated into two sections and holes are formed on one section, it is allowable to prepare another glass preform having a hole extending over the entire length and join the entire glass preform or a separated section of this glass preform to the glass preform 1.

In contrast, the first example illustrated in FIGS. 2A and 2B in which the glass preform 1 is not separated into two and the holes 13 are formed on one end has the following advantages: no necessity for joining the glass preforms together, no problem with insufficient strength at the joint, and no misalignment between the center axes of the two glass preforms that are joined together.

If, in the same manner as in the above examples, the method of boring the holes 13 on one end of the cylindrical glass preform 1 is used, there is advantages such as a constant outer diameter of the joined glass preform along the longitudinal direction and good operability when compared with the method of binding together a plurality of glass tubes or a plurality of glass tubes and glass rods so that they are tightly packed, then integrating them together, thereby producing a glass preform having holes, and then joining the glass preform to a solid cylindrical glass preform. The present invention is not limited the above examples. The preparation of the glass preform can be by binding together a plurality of glass tubes or a plurality of glass tubes and glass rods so that they are tightly packed, then integrating them together, thereby producing a glass preform having holes, and then joining the glass preform to a solid cylindrical glass preform.

The diameter, the number, and the positions of the holes are decided depending on the required characteristics of the optical fiber.

With the above preparation step, the glass preform 1 is produced that has the holes 13 extending in the longitudinal direction formed on one end.

Figure 4:
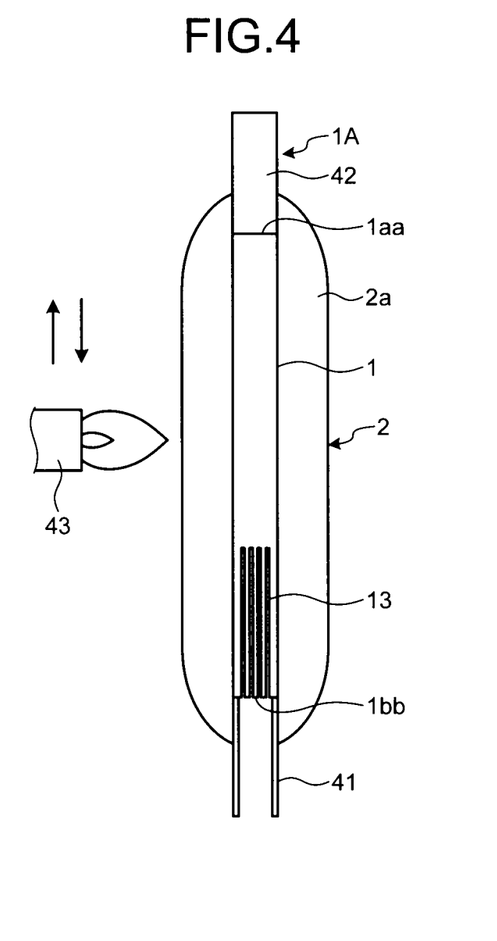
FIG. 4 is a schematic diagram that explains the synthesis step.

The synthesis step of Step S102 will be explained below. FIG. 4 is a schematic diagram that explains the synthesis step.

The synthesis step involves synthesizing glass particles made of silica glass or the like for forming a cladding by using a VAD method, an OVD method or the like, on the outer circumference of the glass preform 1 that has the holes 13 formed on one end. In the following, an example will be explained using the OVD method.

Before synthesizing glass particles on the outer circumference of the glass preform 1, a tubular member 41 is joined to an end 1*bb* of the glass preform 1 with the holes 13 formed thereon in such a manner that the hollow portion of the tubular member 41 is in communication with the holes 13 so that every one of the holes 13 is open to the air. A supporting member 42 that supports the glass preform 1 is joined to the other end 1*aa* of the glass preform 1. The supporting member 42 joined to the end 1*aa* can be either a tubular member or a solid member. From the perspective of the strength necessary to support the glass preform 1, the supporting member 42 is preferable to be a solid member as illustrated in FIG. 4.

The glass preform 1 that has the holes 13 formed on one end and that is joined with the tubular member 41 and the supporting member 42 is called "target rod 1A".

The target rod 1A is axially supported by an OVD-based producing apparatus in such a manner that a not-illustrated holding mechanism of the producing apparatus holds one end at the supporting member 42 and the other end at the tubular member 41. A not-illustrated driving mechanism of the producing apparatus rotates the target rod 1A at a predetermined speed. The driving mechanism linearly moves a glass particle synthesis burner 43 back and forth along the axial direction of the target rod 1A.

The glass particle synthesis burner 43 is supplied with a glass material gas of $SiCl_4$ gas and combustion gases that include $H_2$ gas and $O_2$ gas, and flame-hydrolyzes the glass material gas by flame that is produced the combustion gases, thereby synthesizing fine glass particles. The synthesized glass particles are sprayed from the glass particle synthesis burner 43 onto the outer circumference of the rotating target rod 1A and thus a glass-particle deposit layer 2*a* is formed. As described above, a porous glass preform 2 is synthesized.

Figure 5:
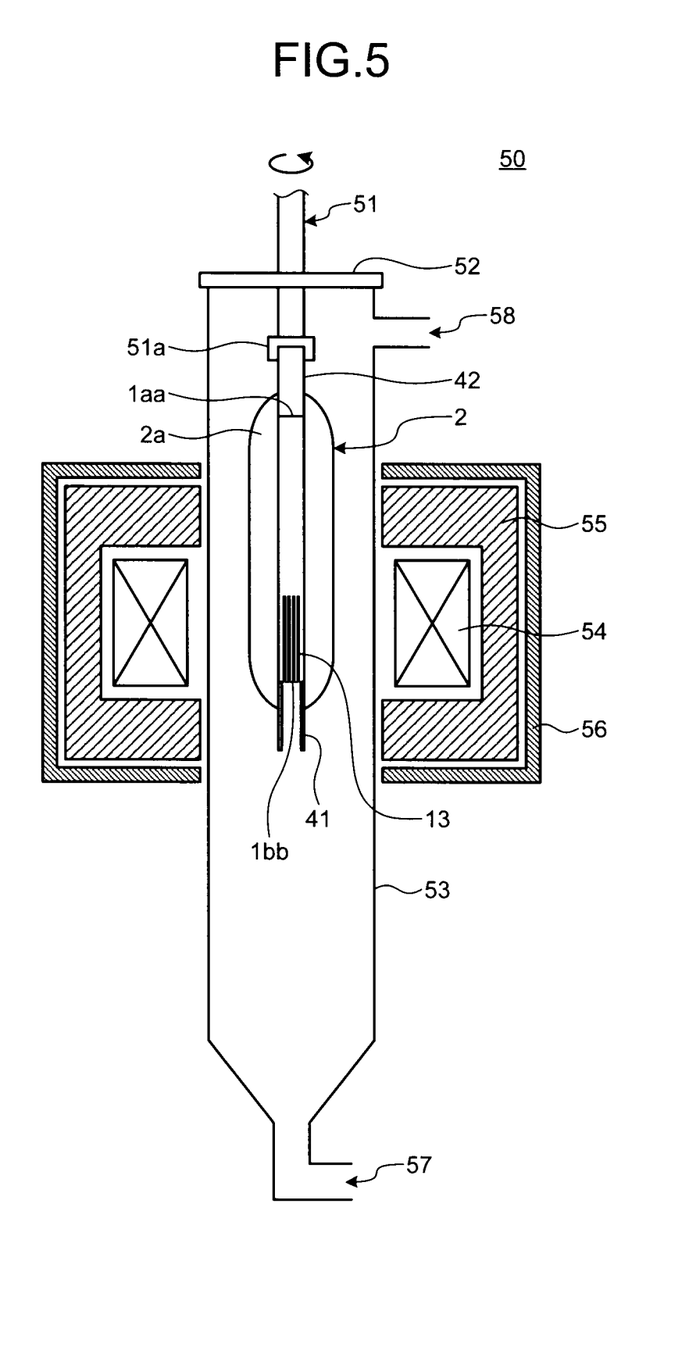
FIG. 5 is a diagram that explains an electric furnace (sintering furnace) that is used at the sintering step.

The sintering step of Step S103 will be explained below. FIG. 5 is a diagram that explains an electric furnace (sintering furnace) 50 that is used at the sintering step according to the present embodiment.

The sintering furnace 50 includes a rotating-and-moving-up/down mechanism 51 that has a holder 51*a* that holds the porous glass preform 2; a core tube 53 that accommodates therein the porous glass preform 2 and that is made of silica glass; an upper lid 52 of the core tube 53; a circular multi-heater 54 that surrounds the outer circumference of the core tube 53 and that heats the porous glass preform 2 from outside; and a furnace body 56 that surrounds the outer circumference of the core tube 53 and that accommodates therein the multi-heater 54 in such a manner that a heat insulator 55 is between the furnace body 56 and the multi-heater 54.

The core tube 53 further includes a gas supply port 57 on a lower section through which an inert gas, such as a helium gas, and an inert gas including chlorine gas are supplied into the core tube 53 and a gas ejecting port 58 on an upper section through which used gasses are ejected from the core tube 53.

The method of sintering the porous glass preform 2 by using the sintering furnace 50 involves putting the porous glass preform 2 in such a manner that the end 1*bb* with the holes 13 formed thereon points downward and then holding the supporting member 42 that is connected on the upside by the holder 51*a* of the rotating-and-moving-up/down mechanism 51. The end 1*bb* of the porous glass preform 2 with the holes 13 formed thereon is still joined to the tubular member 41 in the same manner as it is at the synthesis step. The hollow portion of the tubular member 41 is still in communication with the holes 13, and every one of the holes 13 is still open to the air.

After that, by operation of the rotating-and-moving-up/down mechanism 51, the porous glass preform 2 moves down and is inserted into the core tube 53 and then the core tube 53 is covered with the upper lid 52. Then, the porous glass preform 2 is set to a predetermined start position and the temperature of the heater 54 is increased to a predetermined level about 1500° C.

After that, a sintering gas that contains helium gas is supplied through the gas supply port 57 into the core tube 53. Then, the rotating-and-moving-up/down mechanism 51 rotates and moves down the porous glass preform 2 at a predetermined relative moving speed with respect to a heated area.

With the sintering step, the glass-particle deposit layer 2*a* of the porous glass preform 2 is vitrified into transparent glass and a transparent optical fiber preform is produced.

If necessary, a dehydration step can be added, before the sintering step, to heat the porous glass preform 2 under a dehydration gas atmosphere containing helium gas and chlorine gas at a processing temperature from 900° C. to 1300° C.

As described above, the optical fiber preform having holes is produced.

Figure 6:
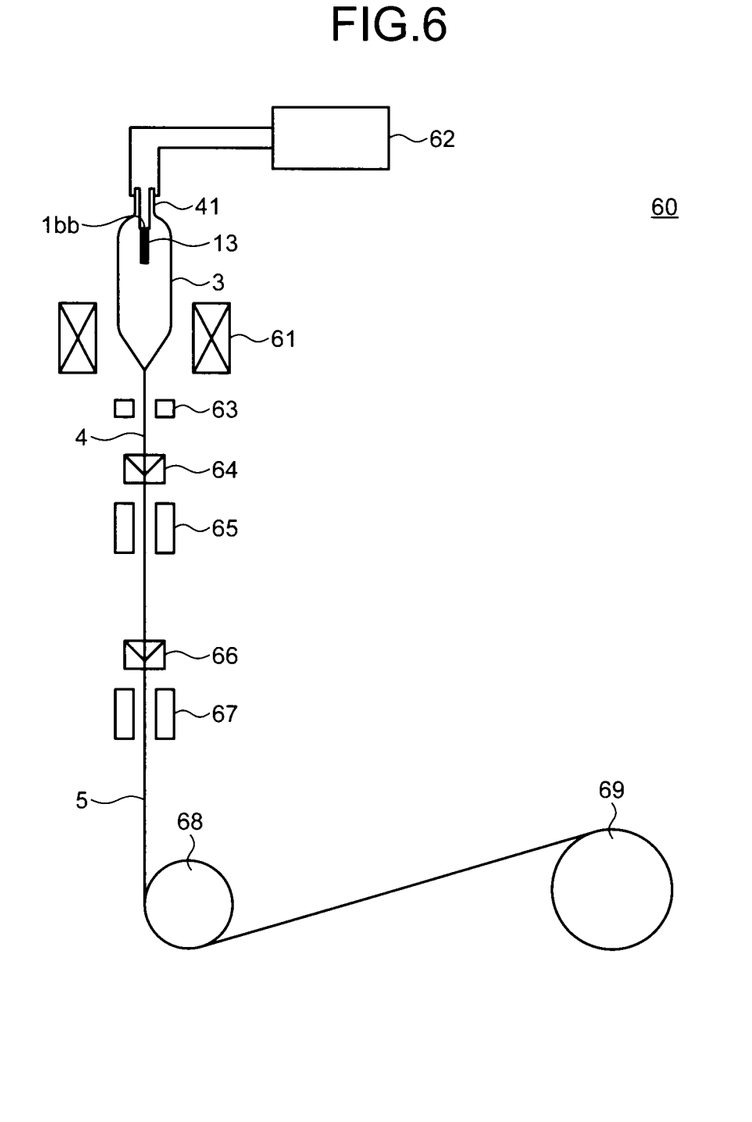
FIG. 6 is a diagram that explains a drawing equipment that is used at the drawing step.

The drawing step of Step S104 will be explained below. FIG. 6 is a diagram that explains a drawing equipment 60 that is used at the drawing step according to the present embodiment.

The drawing step involves arranging the optical fiber preform 3 that is produced by the sintering step (Step S103) in such a manner that the end 1*bb* having the holes 13 formed thereon points upward and then drawing the end 1*aa* having no holes 13 formed thereon.

Firstly, the optical fiber preform 3 is arranged inside an electric furnace (drawing furnace) of the drawing equipment 60 in such a manner that the end 1*bb* with the holes 13 formed thereon points upward. Then, the other end of the optical fiber preform 3 with no holes 13 formed thereon is fused by the heat of a heater 61 that is inside the drawing furnace and a glass optical fiber 4 is drawn in the vertically downward direction. The end 1*bb* of the optical fiber preform 3 with the holes 13 formed thereon is still joined to the tubular member 41 in the same manner as it is at the sintering step. The hollow portion of the tubular member 41 is still in communication with the holes 13, and every one of the holes 13 is still open to the air.

It is allowable to replace the tubular member 41 with a new one before the drawing step. However, the continuous use of the same tubular member 41 over the synthesis step, the sintering step, and the drawing step makes the step of replacing the tubular member 41 unnecessary and enables easier production of an optical fiber having holes.

A hole pressure device 62 is joined to the upper end of the optical fiber preform 3 via the tubular member 41. By sending an inert gas, such as $N_2$ and Ar, from the hole pressure device 62 into the holes 13 of the optical fiber preform 3, the pressure on the inside of the holes 13 is increased. With this configuration, the optical fiber is drawn without the holes 13 crushed.

Then, an ultraviolet curable resin is applied to the outer circumference surface of the glass optical fiber 4 by using a coating device 64 while the outer diameter of the drawn glass optical fiber 4 is monitored by using an outer-diameter measuring device 63. After that, the applied ultraviolet curable resin is exposed to ultraviolet irradiation from an ultraviolet irradiating device 65 and hardened and thus a primary coating layer is formed. Then, an ultraviolet curable resin is applied to the primary coating layer by using a coating device 66. After that, the applied ultraviolet curable resin is exposed to ultraviolet irradiation from an ultraviolet irradiating device 67 and hardened and thus a secondary coating layer is formed. The coated optical fiber is called "optical fiber 5". It is allowable to provide an outer-diameter measuring device, which is not-illustrated, at the position after each ultraviolet curable resin is applied. The number of formed coating layers is adjustable depending on the purpose for which the optical fiber 5 will be used. The number of coating devices, the ultraviolet irradiating devices, and the outer-diameter measuring devices is decided in accordance with the number of coating layers. It is allowable to use a method of applying a plurality of coating layers at the same time and then hardening the coating layers.

After that, a guide roller 68 leads the optical fiber 5 to a winder 69 and the winder 69 winds the optical fiber 5 onto a bobbin. The optical fiber 5 is thus produced.

According to the present embodiment, within a certain period from the start of the drawing, the normal solid section of the optical fiber 5 is drawn and, after that, the hole-including section of the optical fiber 5 is subsequently drawn.

According to the present embodiment, the step of sintering the porous glass preform 2 involves arranging the porous glass preform 2 in such a manner that the end with the holes 13 thereon points downward and the holes 13 are open to the air and then sintering the porous glass preform 2. Moreover, the length of the holes 13 is equal to or less than half the entire length of the glass preform 1. Therefore, the holes 13 are less likely to be affected by shrinkage of the porous glass preform 2 caused by the sintering and extension caused by its own weight during heating and thus the produced optical fiber preform 3 that is produced has the holes 13 with suppressed deformation in the longitudinal direction. By drawing the optical fiber preform 3 produced according to the present embodiment, the optical fiber 5 that is produced has the holes with suppressed deformation in the longitudinal direction.

The degree of deformation of the porous glass preform 2 caused by the sintering increases as the optical fiber preform 3 becomes larger. The above effect becomes particularly notable when the weight of the optical fiber preform 3 is equal to or larger than 10 kg.

Moreover, because the tubular member 41 that is joined at the synthesizing step to the end 1bb of the glass preform 1 with the holes 13 formed thereon is used in succession during the sintering step and the drawing step, the step of replacing the tubular member 41 is unnecessary, which makes it possible to produce the optical fiber 5 having holes more easily.

Moreover, the drawing step enables drawing of the solid optical fiber 5 and then, subsequently, drawing of the optical fiber 5 having the holes. Within a certain period from the start of drawing, due to adjustment of the drawing conditions or the like, the drawn optical fiber has a defective section. It is possible, in the present embodiment, to adjust the conditions when the solid optical fiber 5 is drawn. Because the part of the optical fiber preform 3 having the holes 13 is drawn thereafter, the length of the defective section occurring due to the condition adjustment or the like, is reduced to the shortest possible. As a result, the yield rate of the optical fiber 5 having the holes increases.

Although, in the above embodiment, the optical fiber preform 3 produced by the sintering step is drawn directly, it is allowable to add, after the sintering step, a step of stretching the optical fiber preform 3 and drawing the stretched optical fiber preform 3.

The present invention will be explained in detail below with reference to Examples and Comparative examples. It should be noted that the present invention is not limited to the following Examples and Comparative examples.

Firstly, in Example 1, a glass preform having holes on one end was produced in the following manner according to the above embodiment.

Firstly, by using the VAD method, a glass preform was produced that includes a core doped with Ge and a cladding that was on the outer circumference of the core and that was made of pure silica glass. The ratio of the outer diameter of the core to the outer diameter of the cladding was 1:5. The produced glass preform was heated and stretched so that its outer diameter becomes 40 mm and its length becomes 1000 mm and then the stretched glass preform was separated into a first glass preform having a length of 700 mm and a second glass preform having a length of 300 mm.

Then, six holes ware bored, by using a drill, on the cladding portion at one end of the second glass preform that had a length of 300 mm in such a manner that the holes surrounded the outer circumference of the core and extend in the longitudinal direction.

Then, the formed holes were cleaned and polished. The end surface of the second glass preform butted against the end surface of the first glass preform that had a length of 700 mm and the butt portion was heated by a flame and, thereby, the two separate glass preforms were fusion-spliced together. Therefore, the length of the holes was equal to or less than one third of the entire length of the glass preform.

Then, a tubular member was joined to the end of the glass preform having the holes formed thereon in such a manner that the hollow portion of the tubular member was in communication with the holes so that every hole was open to the air. A supporting member was joined to the other end of the glass preform to support the glass preform. A target rod was thus produced.

Then, each of the tubular member and the supporting member, which were joined to the ends, were held, and a glass particle synthesis burner was moved linearly in the axial direction of the target rod, and thereby, glass particles were deposited on the outer circumference of the target rod, and thus a porous glass preform was produced.

Then, the porous glass preform was arranged in such a manner that the holes were open to the air and the end having the holes formed thereon pointed downward. The supporting member that was joined to the upper end was held by a holder of a rotating-and-moving-up/down mechanism. The porous glass preform was then inserted into a core tube. After that, the porous glass preform was sintered under an atmosphere containing helium gas and chlorine gas at a temperature of about 1500° C. and an optical fiber preform was produced.

Then, the produced optical fiber preform was arranged in such a manner that the end having the holes formed thereon pointed upward, and the other end having no holes formed thereon was drawn. At the drawing, the end having the holes formed thereon was still joined to the tubular member in the same manner as it was at the sintering step. The hollow portion of the tubular member was still in communication with the holes and every hole was still open to the air.

A hole pressure device was joined to the upper end of the optical fiber preform via the tubular member. At drawing the part having the holes formed thereon, by operation of the hole pressure device, $N_2$ gas was sent into the holes of the optical fiber preform and the pressure on the inside of the holes was increased.

A section of the produced optical fiber that 25 km extended for from an end-of-sintering terminal (terminal that has been sintered immediately before the end of the sintering step) was separated every 5 km and the diameter of each hole on each end surface was observed.

If the average of the observed diameters of the holes (6 ends×6 holes) is Da, the minimum diameter is Ds, and the maximum diameter is Dl, then (Dl−Ds)/Da was 3%, which is extremely small.

In Example 2, Another optical fiber was produced in almost the same manner as in Example 1 except that the glass preform having a length of 1000 mm was separated into a first glass preform having a length of 600 mm and a second glass preform having a length of 400 mm, and holes were bored on the second glass preform having a length of 400 mm. Therefore, the length of the holes was equal to or less than half the entire length of the glass preform.

A section of the produced optical fiber that 25 km extended for from the end-of-sintering terminal was separated every 5 km and the diameter of each hole on each end surface is observed.

If the average of the observed diameters of the holes (6 ends×6 holes) is Da, the minimum diameter is Ds, and the maximum diameter is Dl, then (Dl−Ds)/Da was 5%, which is extremely small.

In Example 3, another optical fiber was produced in almost the same manner as in Example 1 except that the glass preform having a length of 1000 mm was not separated into two and 300 mm-depth holes were formed on one end of the glass preform. Therefore, the length of the holes was equal to or less than one third of the entire length of the glass preform.

A section of the produced optical fiber that 25 km extended for from the end-of-sintering terminal was separated every 5 km and the diameter of each hole on each end surface was observed.

If the average of the observed diameters of the holes (6 ends×6 holes) is Da, the minimum diameter is Ds, and the maximum diameter is Dl, then (Dl−Ds)/Da was 5%, which is extremely small.

In Comparative example 1, another optical fiber was produced in almost the same manner as in Example 1 except that a glass preform having a hole extending over the entire length of 1000 mm was used.

A section of the produced optical fiber that 25 km extended for from the end-of-sintering terminal was separated every 5 km and the diameter of each hole on each end surface was observed.

If the average of the observed diameters of the holes (6 ends×6 holes) is Da, the minimum diameter is Ds, and the maximum diameter is Dl, then (Dl−Ds)/Da was 30%, which is large.

In Comparative example 2, another optical fiber was produced in almost the same manner as in Example 1 except that a glass preform having a length of 1000 mm was separated into a first glass preform having a length of 600 mm and a second glass preform having a length of 400 mm, and holes were formed on the first glass preform having a length of 600 mm. Therefore, the length of the holes was longer than half the entire length of the glass preform.

A section of the produced optical fiber that 25 km extended for from the end-of-sintering terminal was separated every 5 km and the diameter of each hole on each end surface was observed.

If the average of the observed diameters of the holes (6 ends×6 holes) is Da, the minimum diameter is Ds, and the maximum diameter is Dl, then (Dl−Ds)/Da was 22%, which is large.

According to the present invention, a method is provided that enables the production of an optical fiber preform and an optical fiber having holes in the longitudinal direction that have suppressed deformation.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of producing an optical fiber preform, the method comprising:
    preparing a glass preform that has a hole extending in a longitudinal direction formed on one end of the glass preform in such a manner that a length of the hole is equal to or less than half of an entire length of the glass preform;
    synthesizing a porous glass preform by depositing glass particles on an outer circumference of the glass preform having the hole formed on the end; and
    sintering the porous glass preform after arranging the porous glass preform in such a manner that the end having the hole formed thereon points downward and the hole is open to air.

2. The method according to claim 1, wherein the length of the hole is equal to or less than one third of the entire length of the glass preform.

3. A method of producing an optical fiber, the method comprising:
    arranging the optical fiber preform that is produced by the production method of claim 1 in such a manner that the end having the hole formed thereon points upward; and
    drawing the other end of the optical fiber preform on which the hole is not formed.

4. A method of producing an optical fiber, the method comprising:
    arranging the optical fiber preform that is produced by the production method of claim 2 in such a manner that the end having the hole formed thereon points upward; and
    drawing the other end of the optical fiber preform on which the hole is not formed.

* * * * *